(12) United States Patent
Lemmens

(10) Patent No.: US 6,174,027 B1
(45) Date of Patent: Jan. 16, 2001

(54) AJUSTABLE SEAT ASSEMBLY FOR BICYCLES AND THE LIKE

(76) Inventor: Joseph R Lemmens, 910 S. Salem St., Apex, NC (US) 27502

( * ) Notice: Under 35 U.S.C. 154(b), the term of this patent shall be extended for 0 days.

(21) Appl. No.: 09/296,968

(22) Filed: Apr. 22, 1999

(51) Int. Cl.⁷ .................................................. B62J 1/00
(52) U.S. Cl. ............................... 297/215.15; 297/215.14; 297/215.13
(58) Field of Search .................. 297/215.15, 215.14, 297/215.13

(56) References Cited

U.S. PATENT DOCUMENTS

| | | | |
|---|---|---|---|
| 4,836,604 | * | 6/1989 | Romano ....................... 297/215.15 X |
| 5,048,891 | * | 9/1991 | Yach ............................ 297/215.15 X |
| 5,190,346 | * | 3/1993 | Ringle .......................... 297/215.15 X |
| 5,383,706 | * | 1/1995 | Chen ............................ 297/215.15 X |
| 5,441,327 | * | 8/1995 | Sanderson .................... 297/215.15 X |
| 5,466,042 | * | 11/1995 | Herman ........................... 297/215.15 |
| 5,915,784 | * | 6/1999 | Clark ............................... 297/215.15 |

* cited by examiner

Primary Examiner—Laurie K. Cranmer
(74) Attorney, Agent, or Firm—Eric Fincham

(57) ABSTRACT

The present device is an adjustable seat assembly for bicycles and the like. The adjustable seat assembly has a continuous manually operated tilt adjustment which allows the rider to adjust the inclination of the seat while riding the cycle. The seat assembly also includes an independent fore and aft adjustment for the seat, allowing the rider dual control of the seat position. Ease of operation is obtained through a highly accessible handwheel and control lever.

10 Claims, 5 Drawing Sheets

AJUSTABLE SEAT ASSEMBLY FOR BICYCLES AND THE LIKE

FIELD OF THE INVENTION

The present invention relates to the design and construction of cycle seat post assemblies. More specifically, the present invention relates to cycle seat post designs which are adjustable while a cyclist is riding the cycle or the like.

DESCRIPTION OF THE PRIOR ART

Over the years, several cycle seat post assembly designs have offered various degrees of adjustability in order to provide the most comfortable riding position. Both the inclination and the horizontal position of the saddle affect the comfort of the rider. Due to the demand for adjustable seat assemblies, many inventors have applied for and obtained patents for various designs. Most of these designs have required the rider to dismount before adjusting the inclination of the seat, such as U.S. Pat. No. 5,226,624 by Alan S. Kingsbery in 1993 and U.S. Pat. No. 5,547,155 by Eric Herting in 1997.

Several designs have permitted adjustment while riding. U.S. Pat. No. 5,441,327, issued on Aug. 15, 1995 to Mark B. Sanderson, and U.S. Pat. No. 5,513,895, issued on May 6, 1997 to Gary M. Olson, allow adjustment during pedaling. However, these designs are complex, expensive, and lack the needed rigidity to hold the cycle saddle solidly in place.

Other designs such as U.S. Pat. No. 4,836,604, issued on Jun. 6, 1989 to Antonio Roinano, uses a double control in order to tilt the seat. During the adjustment of the seat inclination, the seat is free to move forward or rearward and consequently is difficult to position quickly. The small control wheel is also difficult to rotate due to both its awkward location and the friction created by the rider's weight.

U.S. Pat. No. 5,571,273, issued on Nov. 5, 1996 to Sulevi Saarinen, shows a manually tiltable seat primarily for use on an exercise bicycle. This design does not accommodate the low cost mass production bicycle seat design using two rails. Also, this design does not provide any horizontal adjustment of the seat, nor any shock cushioning provided by the two rail seat design. Furthermore, most of the handwheel's circumference is hidden by the lower portion of the seat and rotation of the handwheel is difficult.

None of the prior adjustable seat designs combine simplicity, durability, low cost, and easy adjustability while accommodating the current mass production seat design. Therefore there is a need for a simple, rigid and low cost cycle seat which permits the cyclist to adjust the seat easily.

OBJECTS AND ADVANTAGES

The primary object and advantage of the present invention is to provide an adjustable cycle seat system having a design which provides the rider with the capability to easily adjust the saddle position when needed during a ride, even during pedaling. This would allow the rider to use one seat position during warm-up, a second position during aerodynamic riding and a third position for hill climbing. Experience and study show that one degree of tilt can make a large impact on the rider's comfort and performance.

A second object of the invention is to provide a quick and precise adjustment of the seat inclination and position. The seat inclination is controlled through rotation of a control handwheel located underneath and behind the seat. The maximum tilt in both directions can be set by the rider by means of two adjustable locknuts installed on the control bolt. Control of the horizontal position of the saddle is optional and would be locked by a cam action bolt.

Another advantage of this invention is the ability to incorporate a suspension into the seat assembly. The addition of an elastomer or spring member as part of the control bolt and seat support system would improve the comfort of the rider by allowing the rear of the saddle to absorb impact loads.

Another object of this design is to accommodate the common two rail seat. This allows the rider to use the proposed seat assembly with almost any saddle currently on the market.

A further object of this invention is to provide a design which can be manufactured out of low cost components such as castings, extrusions, and readily available machine parts. The number of parts in the design is also minimized. Not only is the cost of the seat assembly reduced, but it is much more durable.

BRIEF DESCRIPTION OF THE DRAWINGS

FIG. 1b is a sectional view taken along the lines B—B of FIG. 1a.

REFERENCE NUMERALS IN DRAWINGS

FIG. 1

Figure 1A:
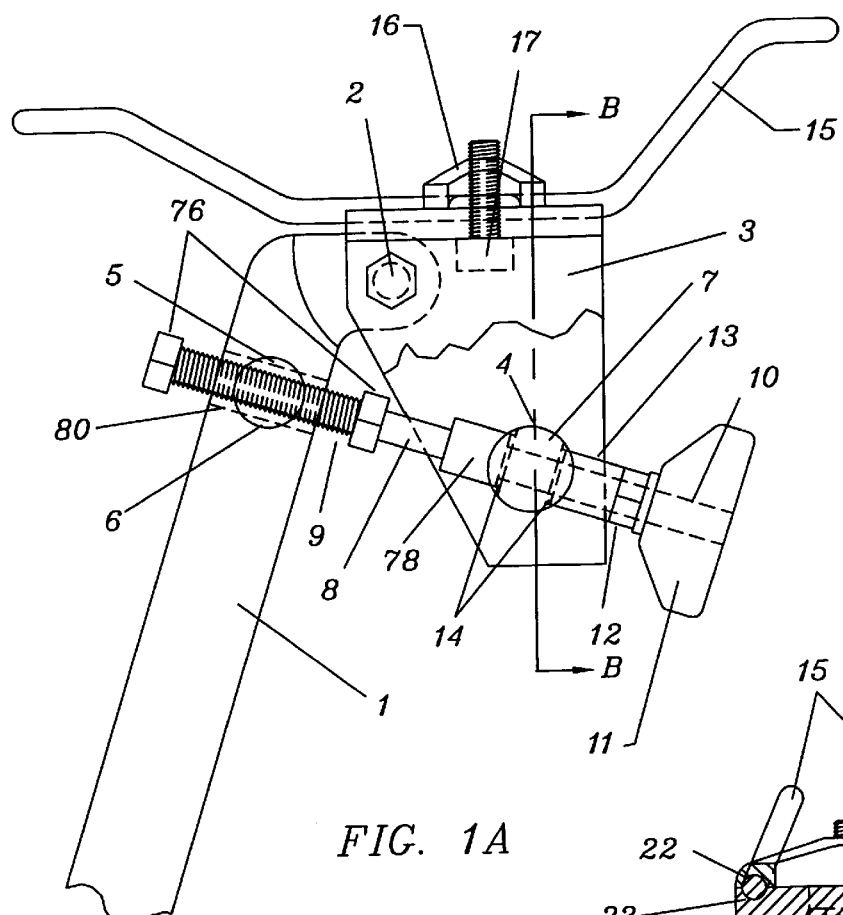
FIG. 1a is an elevational view, partially in section, of a first embodiment of an adjustable seat post of a cycle.

1 seat post
2 pivot
3 seat support
4 cylindrical seat support hole
5 threaded cylinder
6 seat post cylindrical hole
7 seat support cylinder
8 control bolt
9 threaded portion
10 threaded portion
11 handwheel
12 nut
13 locknut
14 antifriction washers
15 seat rails
16 upper clamp
17 clamping bolt
22 groove
23 groove
24 locknut
76 locknuts
78 enlarged portion
80 channel FIG. 2
- 18 double threaded bolt, coarse thread portion
- 19a fine thread portion
- 19b coarse thread portion
- 20a seat support control hole
- 20b threaded cylinder
- 21 threaded portion FIG. 3
- 25 seat post
- 26 seat support
- 27 larger diameter portion
- 28 seat post thread
- 29 threaded screw
- 30 seat support reactive member
- 31 threaded portion
- 32 rail quick release
- 33 handwheel nut
- 34 locknut
- 35 slot wall
- 36 antifriction washers FIG. 4
- 37 seat post
- 38 seat support
- 39 threaded bolt
- 40 locknut
- 41 seat post hole
- 42 antifriction washer or bearing
- 43 locknut
- 44 thread
- 45 elastomeric member
- 46 antifriction washer or bearing
- 48 locknut
- 49 threaded cylinder
- 84 transverse cylindrical hole FIG. 5
- 50 seat post
- 51 seat support supporting surface
- 52 cylindrical upper section
- 53 rear block, section
- 54 clearance section
- 55 front surface
- 56 extension part
- 57 hole
- 58 hooking section
- 59 bolt
- 60 lower seat support section
- 61 groove
- 62 upper clamp
- 63 bolt
- 64 threaded hole
- 65 control bolt
- 66 threaded front section
- 67 seat support hole
- 68 threaded cylinder
- 69 threaded section
- 70 handwheel
- 71 locknut
- 72 low friction and compression washers
- 73 low friction washer
- 74 clearance section
- 75 clearance slot
- 76 threaded hole
- 82 control bolt

SUMMARY OF INVENTION

The present adjustable seat design provides an adjustable cycle seat system which provides the rider with the capability to easily adjust the saddle's horizontal position and tilt when needed during a ride, even during pedaling.

The seat assembly is allowed to pivot on the upper end of the seat tube. The inclination is controlled by rotating a handwheel which in turn rotates a threaded rod which is connected to both the seat support member and the seat tube. As the threaded rod is rotated, the seat support member is pivoted towards or away from the seat tube, thus changing the seat inclination. The system further includes a separate adjustment for the horizontal position of the seat. A locking mechanism can also be included to lock the seat into a certain horizontal position.

FIG. 1—Description

Figure 1B:
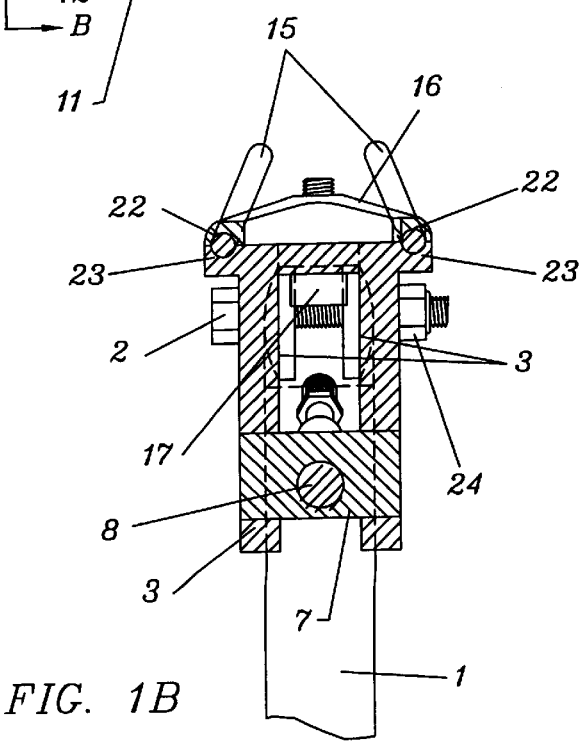

The first and preferred embodiment of the adjustable seat assembly for cycles and the like is illustrated in FIG. 1A (side view, with front of cycle at left of figure) and FIG. 1B (section view following line B—B in FIG. 1A). As illustrated in FIG. 1A, a seat support 3 is connected to a seat post 1 by a pivot bolt 2; a second connection is provided by a control bolt 8. Control bolt 8 has a threaded portion 10 axially secured to the seat support 3 through a cylinder 7 which rotates freely in a transverse cylindrical hole 4. Antifriction washers 14 are positioned on either side of cylinder 7. Through the threaded portion 10 of bolt 8, a handwheel 11, a nut 12, and a locknut 13 provide abutment on one side of cylinder 7. Abutment for cylinder 7 on the other side is provided by an enlarged portion 78 of bolt 8. Bolt 8 also has a threaded portion 9 which passes through a channel 80 in seat post 1 and is axially secured to the seat post 1 through a threaded cylinder 5 housed in a transverse cylindrical hole 6. Locknuts 76 are located near each end of threaded portion 9. In FIG. 1B it is seen that seat support 3 basically has an inverse U-shape. Seat rails 15 are fastened to the seat support 3 by an upper clamp 16 and a clamping bolt 17. The seat rails 15 are held in place by means of grooves 22 in upper clamp 16 and complementary grooves 23 in the top of the seat support 3. It is also seen in FIG. 1B that pivot bolt 2, connecting the side walls of seat support 3 and seat post 1, is secured by locknut 24. Control bolt 8 is positioned between the side walls of the seat support. In the customary configuration, a cycle seat(not shown) is attached or molded to the seat rails 15.

Acceptable methods of fabrication for the seat post 1 include casting with some finishing machining, or welding, glueing or press-fitting a machined end onto extruded tubing. The seat support 3 is ideally fabricated by extrusion because of its constant cross-sectional area. The inner spacing between the walls of the seat support 3 and the end of the seatpost 1 must be sufficiently precise that the seat support 3 and the seat post 1 abut smoothly, allowing seat support 3 to pivot about pivot bolt 2. To facilitate the assembly of this preferred embodiment of the cycle seat support assembly, control bolt 8 should be positioned in both seat support 3 and seat post 1 before fastening bolt 2 and locknut 24. The upper clamp 16 can be fabricated by extrusion, casting, or injection, followed by machining. All components should be fabricated from high-strength materials. The bolts and nuts should be made of high-strength steel or titanium. The control bolt 8 and the threaded cylinder 5 should have a high-grade or acme thread. The handwheel II should be made of plastic or composite material for light-weight strength.

Operation

The cyclist, while pedaling, is seated on a cycle seat attached or molded to the seat rails 15. The seat rails 15 are held in place by the grooves 22 in upper clamp 16 and complementary grooves 23 in the seat support 3 (FIG. 1B). The seat rails 15 are fastened to the seat support 3 by means of upper clamp 16 and clamping bolt 17 (FIG. 1A). Without having to interrupt pedaling, the cyclist can adjust the tilt of the seat for maximum comfort and efficiency by rotating the handwheel 11 located behind and under the seat. Handwheel 11 is secured to control bolt 8 by threaded portion 10, nut 12, and locknut 13. Rotation of handwheel 11 thus causes rotation of the threaded portion 9 of control bolt 8. If the threaded portion 9 of control bolt 8 and the threads within cylinder 5 to which bolt 8 is mated are right-handed, a clockwise rotation of handwheel 11 will cause a motion of control bolt 8 toward threaded cylinder 5. Being located in transverse cylindrical hole 6 in seat post 1, cylinder 5 is free to rotate about the axis of cylindrical hole 6 but it is not free to move laterally with respect to seat post 1. As a result, motion of control bolt 8 toward threaded cylinder 5 causes locknut 13 to move toward seat post 1. Since locknut 13 abuts one of the antifriction washers 14, which in turn abuts cylinder 7, the motion of locknut 13 imparts a force on cylinder 7. Being located in transverse cylindrical hole 4 in seat support 3, cylinder 7 translates the clockwise motion of bolt 8 into a clockwise motion of seat support 3 about pivot bolt 2. Seen in FIG. 1B, pivot bolt 2 is held in place by locknut 24. As the seat support 3 rotates clockwise about pivot bolt 2, the front end of seat rails 15 and hence the nose end of the cycle seat that is attached or molded to seat rails 15, tilt upward. Conversely, if handwheel 11 is rotated counterclockwise, control bolt 8 moves away from seat post 1(FIG. 1A). In this case, the enlarged portion 78 of control bolt 8 imparts a force on cylinder 7 through one of antifriction washers 14. The force on cylinder 7 in turn causes a counterclockwise rotation of seat support 3 about pivot bolt 2 and a corresponding downward tilt to the nose of the cycle seat. If left-hand threads are used for bolt 8 and cylinder 5, clockwise rotation of the handwheel 11 will produce a downward tilt of the nose of the cycle seat. Before riding, the bicyclist can adjust the maximum amount of tilt desired by positioning the locknuts 76 with a wrench.

Figure 2:
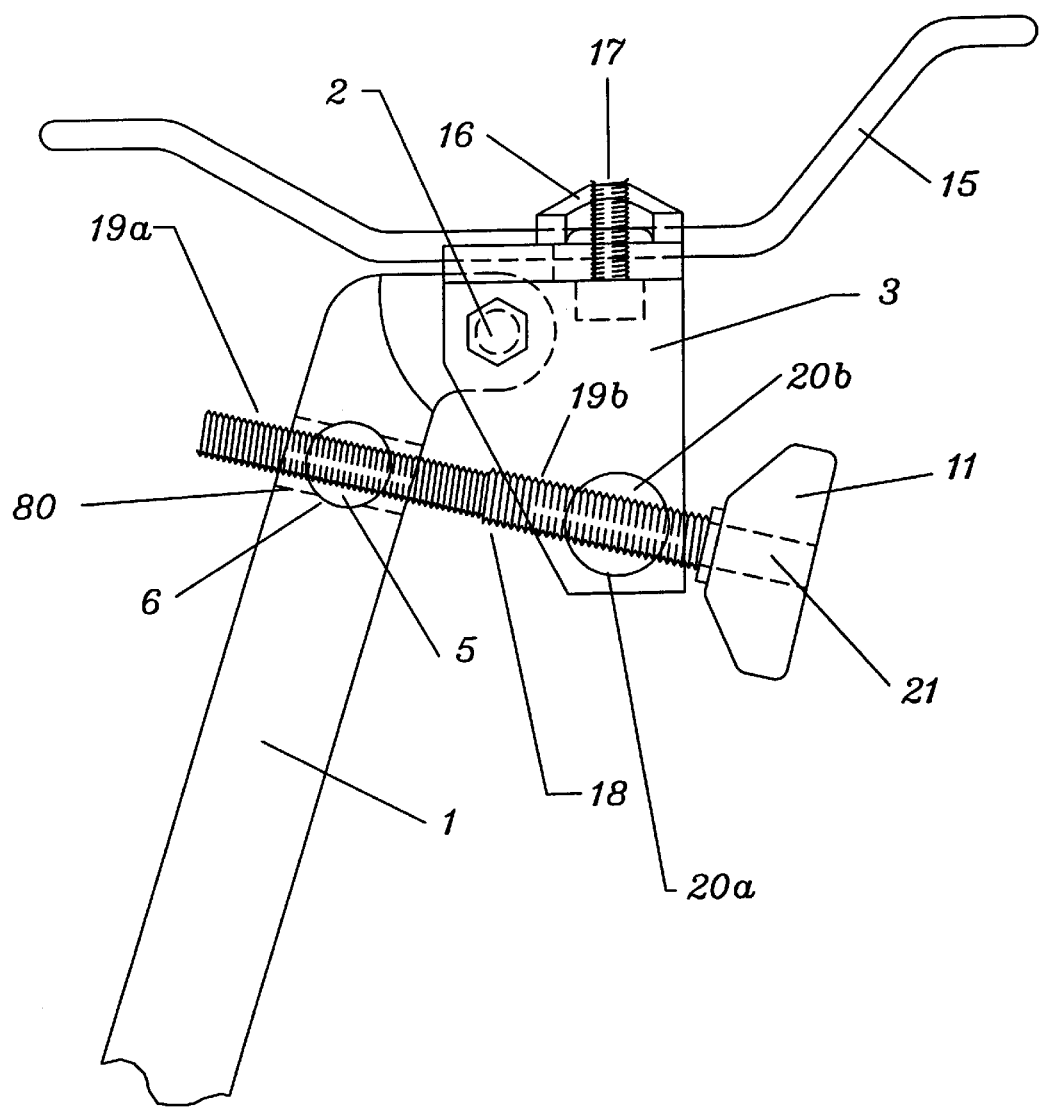
FIG. 2 shows a cross-sectional view of a second embodiment which includes a finer adjustment of the tilt.

Description—FIG. 2

FIG. 2 (side view, with front of cycle to left of figure) shows a second embodiment of the invention, which offers an alternative design for a control bolt. The connection of seat rails 15 to a seat support 3, and the connection of seat support 3 to a seat post 1 is the same as in the first embodiment. In this second embodiment, a control bolt 18 has two threaded sections on its shaft, with a fine thread portion 19 and a coarse thread portion 21. A handwheel 11 is secured to the coarse thread portion 19b with a threadlocking chemical. The fine thread portion 19a of control bolt 18 passes through a channel 80 in seat post 1 and is axially secured to seat post 1 through a threaded cylinder 5 housed in a transverse cylindrical hole 6. The coarse thread portion 19b of bolt 18 is positioned between the walls of seat support 3 and is axially secured to seat support 3 via a threaded cylinder 20b located in a transverse cylindrical hole 20a in seat support 3.

Operation

A cycle seat is attached or molded to the seat rails 15, the seat rails 15 are attached to the seat support 3, and the seat support 3 is attached to the seat post I in the same manner as in the first embodiment. In this second embodiment, handwheel 11 is secured to control bolt 18 by threaded portion 21. Rotation of the handwheel 11 thus causes rotation of both the coarse thread portion 19b and the fine thread portion 19a of bolt 18. The difference in the thread coarseness of portion 19a, which is mated to a threaded cylinder 5 housed in a transverse cylindrical hole 6 in the seat post 1, and portion 19b, which is mated to a threaded cylinder 20b housed in a transverse cylindrical hole 20a in the seat support 3, causes a rotation of control bolt 18 to result in a relative motion of seat support 3 with respect to the seat post 1. If the fine thread portion 19a of control bolt 18 and the threads within cylinder 5 and the coarse thread portion 19b and the threads within cylinder 4 are right-handed, a clockwise rotation of handwheel 11 causes a counterclockwise motion of seat support 3 about pivot bolt 2. As the seat support 3 rotates in a counterclockwise direction about pivot bolt 2, the front end of seat rails 15, and hence the nose end of the cycle seat, tilt downward. Thus, with right hand threads for the threaded members, clockwise rotation of the handwheel 11 will result in tilt of the seat rails 15 in the opposite direction to that of the first embodiment. In this embodiment, the fine thread portion 19a allows a smaller resulting tilt of the seat rails 15 per rotation of the handwheel 11.

Figure 3:
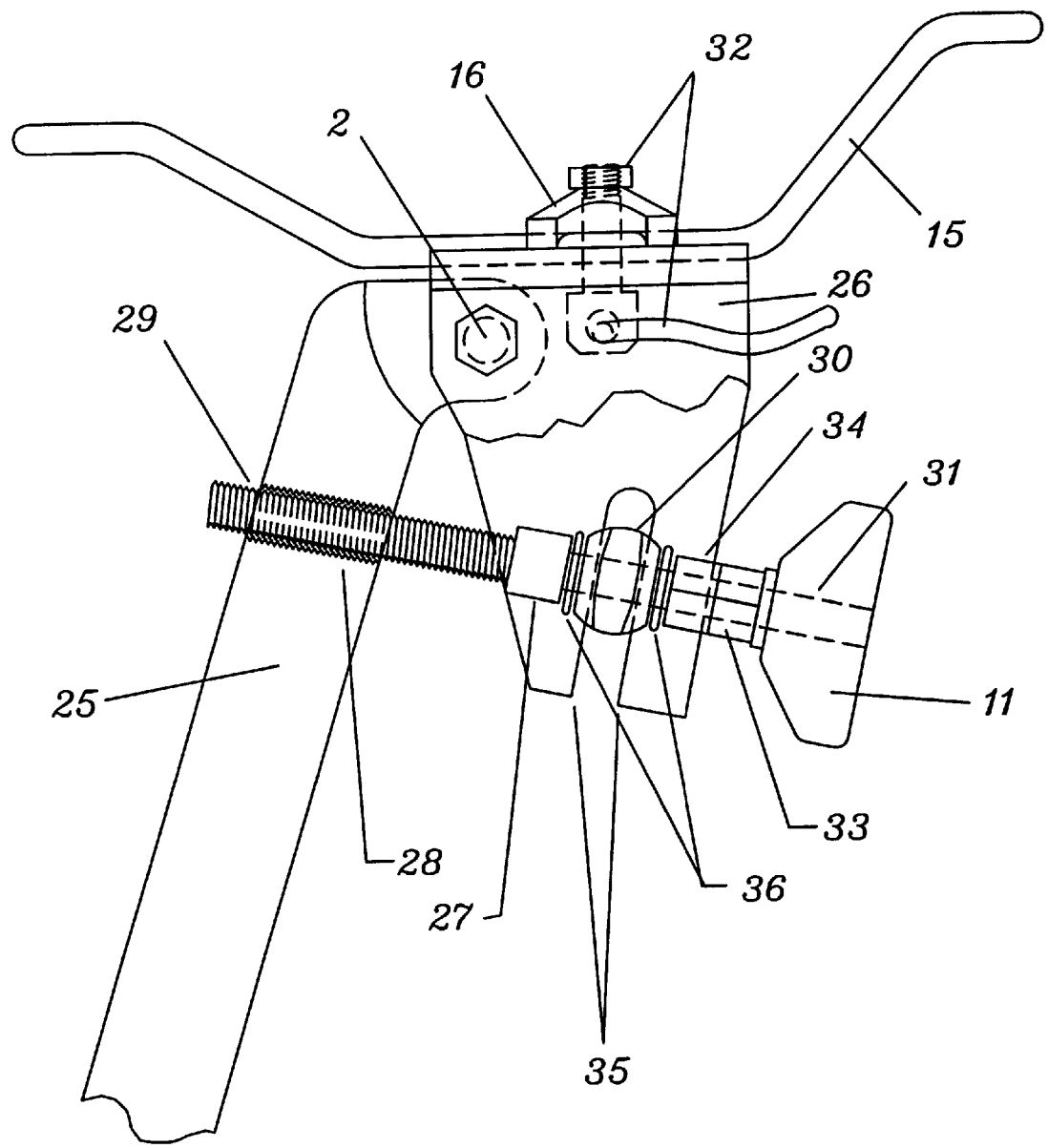
FIG. 3 shows a cross-sectional view of a third embodiment including a quick manual locking and unlocking of the seat rails.

Description—FIG. 3

A third embodiment, illustrated in FIG. 3(side view), differs from the preferred embodiment in the design of one feature of the control bolt. This alternative design is shown with the addition of the well-known quick-release feature to the seat rail locking mechanism. In this embodiment, a control bolt 31 has a larger diameter portion 27 which abuts a block 30 at the front. Rear abutment for block 30 is provided through a locknut 34, a handwheel nut 33, and a handwheel 11. Antifriction washers 36 are located on both sides of block 30. Block 30 is connected to a seat support 26 via a slot wall 35. A threaded section 29 of control bolt 31 is engaged in a threaded hole 28 of a seat post 25. In accordance with the well-known quick-release feature, seat rails 15 are fastened down on seat support 26 by an upper clamp 16 and a quick-release cam bolt and nut 32.

Operation

In this third embodiment, both the tilt and the forward-backward position of the cycle seat can be changed while pedaling. The tilt can be adjusted by rotation of the handwheel 11, as in the preferred embodiment. If the threads on the control bolt 29 and threaded hole 28 of seat post 25 are right-handed, a clockwise rotation of the handwheel 11 causes motion of the control bolt 31 toward the seat post 25 through threaded hole 28. This motion imparts a force on a block 30 through a locknut 34 and an antifriction washer 36. The subsequent force on block 30 imparts a clockwise rotation to seat support 26 about pivot bolt 2, and an upward tilt of the front end of the seat rails 15 and, thus, the nose of the cycle seat. As the seat support 26 rotates, block 30 slides upward along slot 35. Conversely, a counterclockwise rotation of handwheel II imparts a force on cylinder 30 through a raised portion 27 of control bolt 29 and an antifriction washer 36. This force results in a counterclockwise rotation of seat support 26 about pivot bolt 2, and a downward tilt of the front end of the seat rails and of the nose of the cycle seat. In this case, block 30 slides downward along slot 35. The forward-backward position of the cycle seat can be adjusted while pedaling by releasing the seat rails with a downward push on the quick-release handle 32, then adjusting the forward-backward position of the seat by pulling the seat forward or pushing it backward, and finally relocking it by pulling up the quick-release handle 32.

Figure 4:
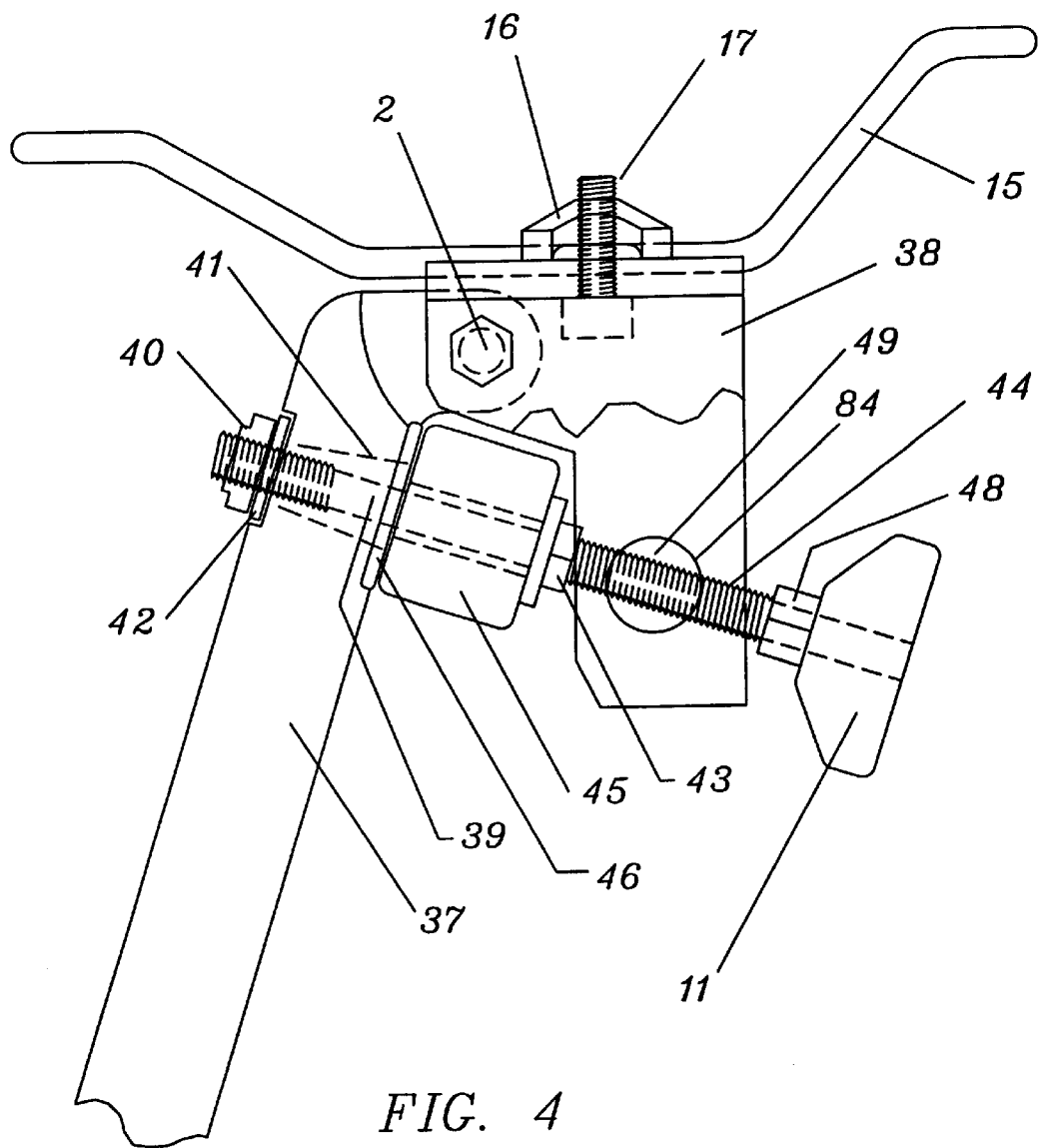
FIG. 4 shows an alternate form of the invention, with an elastomer type of suspension incorporated into the design.

Description—FIG. 4

The fourth embodiment of the present invention, shown in FIG. 4(side view), differs from the preferred embodiment in that it includes some suspension capability. A control bolt 39 is located in a seat post hole 41 of a seat post 37. Control bolt 39 includes an elastomer member 45 which is pre-loaded against a seat post 37 by locknuts 40 and 43. Antifriction washers or bearings 42 and 46 are inserted on both sides of hole 41. A threaded portion 44 of bolt 39 is connected to a seat support 38 via a threaded cylinder 49 housed in a transverse cylindrical hole 84. Handwheel 11 and locknut 48 are positioned at the end of threaded portion 44.

Operation

Rotation of handwheel 11, secured to threaded portion 44 of control bolt 39 by locknut 48, causes rotation of bolt 39. Rotation of bolt 39 causes threaded portion 44 to become engaged with threaded cylinder 49. Rotation of control bolt 39 causes rotation of elastomer member 45, its securing locknut 43, and the retaining locknut 40. Rotation of the elastomer member is facilitated by antifriction washer 46 and rotation of locknut 40 is facilitated by antifriction washer 42. While control bolt 39 is free to rotate about its axis, movement in the direction of its axis, which is perpendicular to seat post 37, is prohibited by the elastomer member and locknut 40. Consequently, rotations of control bolt 39 cause movement of the engaged threaded cylinder 49, which in turn causes rotation of seat support 38 about pivot bolt 2. Hole 41 in seat post 37 is flared to provide room for control bolt 39 to move in the plane of the seat post 39 as it is pulled up or pushed down by rotation of the seat support 38. In this embodiment, if a right-hand thread is used in threaded portion 44 and threaded cylinder 49, clockwise rotation of the handwheel 11 will result in a downward movement of the front of the seat rails and the nose of the cycle seat. A left-hand thread will give the opposite response.

Figure 5:
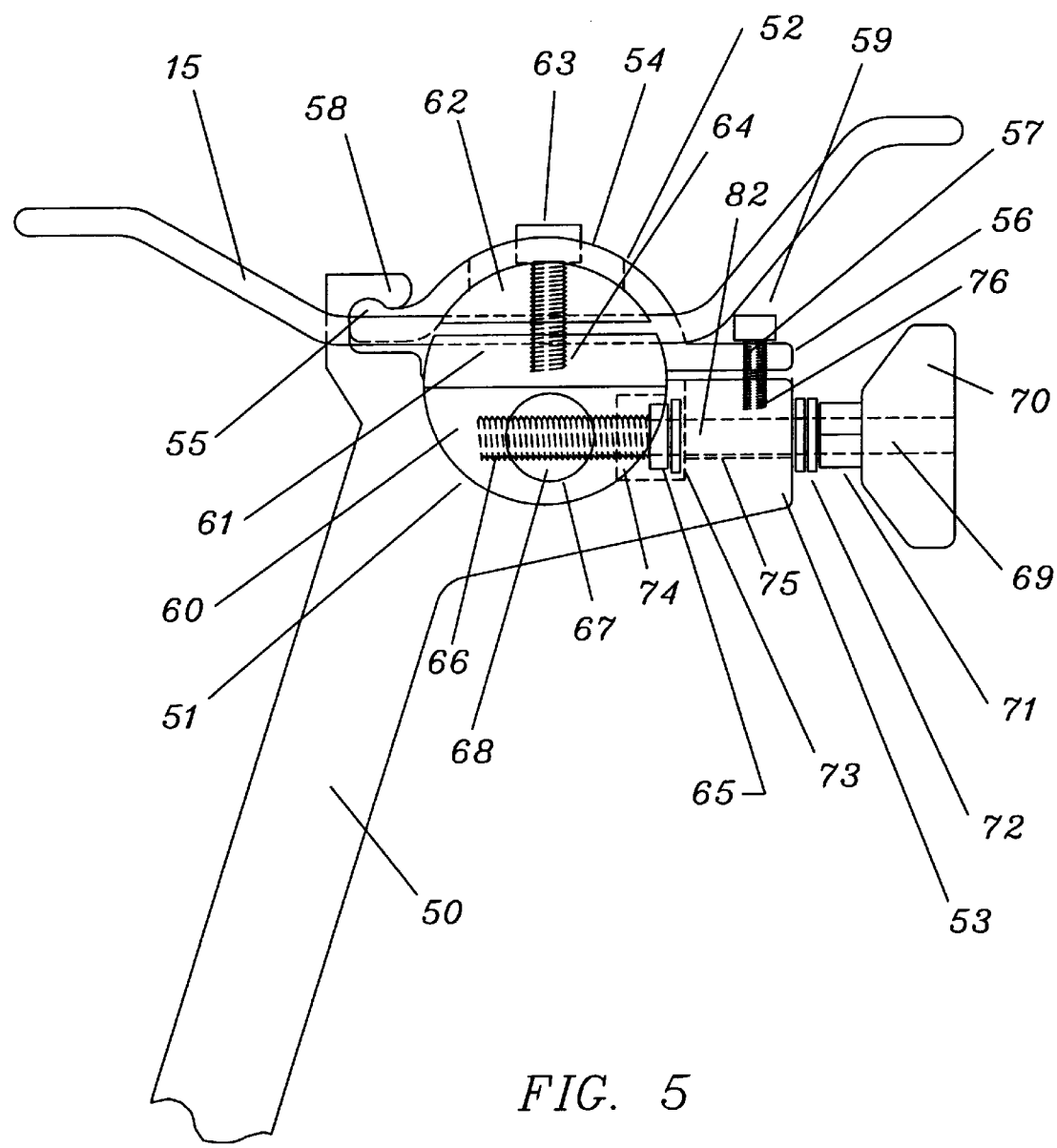
FIG. 5 shows a cross sectional view of a fifth embodiment showing an alternative design of the same invention

Description—FIG. 5

A fifth embodiment of the present invention, shown in FIG. 5(side view), offers an alternative design in which a seat post 50 and an upper section 54 surround a seat support 60 and upper clamp 62. The seat post 50 includes a supporting surface 51, a front holding surface 58, and a rear section 53. A cylindrical upper section 52, attached to the seat post 50, is hooked by its front surface 55 to front holding surface 58 and secured at the rear with an extension part 56 and a threaded bolt 59 through hole 57 and into a threaded hole 76. A lower seat support section 60 and an upper clamp 62 hold rails 15 via a groove 61 and a bolt 63 screwed into threaded hole 64. A control bolt 82 and enlarged section 65 are axially secured in section 53 with antifriction and compression washers 72 and 73. Handwheel 70 and lock-nut 71 are connected to a threaded section 69 and a threaded front section 66 which engages a threaded cylinder 68 housed in a transverse cylindrical hole 67. Recess space 74 is part of seat support 60. Upper slot 75 is part of rear section 53. With the use of nylon thread-locker, the threaded bolt 59 acts as a locknut system.

Operation

A cycle seat is attached or molded to seat rails 15. Seat rails 15 are held in place between seat support 60 and upper clamp 62. Bolt 63 secures upper clamp 62 to seat support 60 through threaded hole 64. Seat support 60 and upper clamp 62 are held through friction between supporting surface 51 of seat post 50 and upper section 54. The front surface 55 of upper section 54 is hooked under front holding surface 58; its extension part 56 is held down by threaded bolt 59 through threaded hole 76. Rotation of handwheel 70, which is secured to control bolt 82 by threaded portion 69 and locknut 71, causes rotation of control bolt 82. Control bolt 82 is axially secured in rear section 53 with rear abutment provided by locknut 71, front abutment provided by enlarged section 65 of control bolt 82, and antifriction and compression washers 72 and 73. Upper slot 75 gives room for bolt 82 to be inserted into rear section 53 of seat post 50 during assembly. Rotation of the control bolt 82 causes rotation of the front threaded portion 66 which is engaged in threaded cylinder 68 housed in transverse hole 67 of lower seat support 60. Recess space 74 allows the seat support 60 to move without striking any portion of control bolt 82. If right-hand threads are used on control bolt 82 and in threaded cylinder 68 to which it is mated, then clockwise rotation of the handwheel 70 will move threaded cylinder 68 and bottom of seat support 60 toward the handwheel, tilting the forward end of the seat rails 15 and the cycle seat nose down. Counterclockwise rotation of the handwheel 70 will move the seat nose up. If lefthand threads are used in the threaded members, the direction of rotation and tilt will the same as those of the preferred embodiment. It is necessary to ensure both low torque of bolt 59 and low friction between supporting surface 51 and seat support 60 in order to achieve an adjustment of the seat tilt during pedaling.

Conclusions and Ramifications

The adjustable seat assembly presented here offers many advantages over existing seat systems. Not only is the design extremely simple and easily manufacturable, but it is completely adjustable while riding. This allows the rider to adjust the tilt and horizontal position of the seat to accommodate different conditions.

It should be noted that the present invention is not intended to be restricted to any particular arrangement or any specific embodiment disclosed herein. The present invention should also not be limited to any specific use. It could be used on equipment ranging from bicycles, bicycle training devices, and paddle boats.

Many of the components in this invention can be altered while still performing the same function. For example, the seat rails and seat support member could be fabricated as a single component using either single or double rails to support the seat. The pivotal end of the seat tube could be constructed with either a single or double walled connection. The handwheel control could be located in either the front or the rear of the seat assembly, whichever is preferred by the rider. Also, the shapes of matching components could be inverted and still operate similarly.

Thus the scope of the invention should be determined by the appended claims and their legal equivalents rather than by the examples given.

What is claimed is:

1. An adjustable seat assembly for a cycle having a seat and a seat tube, said adjustable seat assembly comprising:
   a) a seat support member pivotably mounted on an end of said seat tube,
   b) a clamping attachment attaching said seat support member to said seat,
   c) a control means extending between said seat tube and said seat support member, said control means comprising a rod having a first threaded portion screw threadedly engaging said seat tube, a second threaded portion screw threadedly engaging said seat support member, and abutment means on said second threaded portion on either side of said seat post, whereby motion of the control means causes adjustment of seat inclination by moving one end of said seat support member towards or away from said seat tube, an elastomer member positioned between said seat support member and said seat post providing a suspension between said seat support member and said seat post.

2. The adjustable seat assembly of claim 1 wherein said rod is threaded into a threaded cylinder which is mounted in either said seat tube or said seat support member so that said threaded cylinder is allowed to rotate.

3. The adjustable seat assembly of claim 1 wherein said control means has a control knob located at one end of said control means.

4. The adjustable seat assembly of claim 3 wherein said clamping attachment clamps to two rails attached under said seat and allows for adjustment of the horizontal position of said seat.

5. The adjustable seat assembly of claim 1 wherein said rod has differing pitches on opposing ends.

6. The adjustable seat assembly of claim 5 wherein said control means interacts with said seat post and said seat support member by means of a threaded cylinder.

7. The adjustable seat assembly of claim I wherein said :eat support member is connected to said seat tube with a pivot attachment, whereby said pivot attachment is a loaded member exerting a clamping force on said seat support member and said seat tube such that said seat support member will only pivot upon actuation of said control means.

8. The adjustable seat assembly of claim 1 wherein said elastomer member has an adjustable preload, whereby the amount of damping the suspension provides can be varied.

9. The adjustable seat assembly of claim 1 wherein said clamping attachment clamps to two rails attached under said seat and allows for adjustment of the horizontal position of said seat.

10. An adjustable seat assembly for a cycle having a seat, and a seat tube mounting said adjustable seat assembly to said cycle, said adjustable seat assembly comprising:
   a) a seat support member pivotably mounted on said seat tube,
   b) a clamping attachment attaching said seat support member to said seat,
   c) a control means between said seat tube and said seat support member whereby motion of the control means permits adjustment of seat inclination said control means being a threaded rod threaded into said seat tube and slidably engaged with said seat support member through a slidable reactive member said seat support member being slotted to allow said slidable reactive member to slide vertically to allow varying seat inclination.

\* \* \* \* \*